(12) United States Patent
Bettermann (10) Patent No.: US 10,723,038 B2
(45) Date of Patent: Jul. 28, 2020

(54) DEVICE FOR FORMING ADD-ON PARTS

(71) Applicant: HOMAG Bohrsysteme GmbH, Herzebrock-Clarholz (DE)

(72) Inventor: Thomas Bettermann, Bielefeld (DE)

(73) Assignee: HOMAG BOHRSYSTEME GmbH, Herzebrock-Clarholz (DE)

( * ) Notice: Subject to any disclaimer, the term of this patent is extended or adjusted under 35 U.S.C. 154(b) by 201 days.

(21) Appl. No.: 15/763,433

(22) PCT Filed: Sep. 30, 2016

(86) PCT No.: PCT/EP2016/073440
§ 371 (c)(1),
(2) Date: Mar. 26, 2018

(87) PCT Pub. No.: WO2017/055562
PCT Pub. Date: Apr. 6, 2017

(65) Prior Publication Data
US 2018/0281227 A1    Oct. 4, 2018

(30) Foreign Application Priority Data
Oct. 2, 2015   (DE) .................. 10 2015 219 103

(51) Int. Cl.
*B27N 5/00*    (2006.01)
*B29C 45/14*   (2006.01)
*B29C 45/17*   (2006.01)
*B29C 45/04*   (2006.01)
*B29C 45/00*   (2006.01)
(Continued)

(52) U.S. Cl.
CPC ............ *B27N 5/00* (2013.01); *B29C 45/0001* (2013.01); *B29C 45/14344* (2013.01); *B29C 45/1761* (2013.01); *B29C 31/006* (2013.01); *B29C 70/745* (2013.01); *B29C 2045/0483* (2013.01); *B29C 2045/14352* (2013.01); *B29K 2711/14* (2013.01)

(58) Field of Classification Search
None
See application file for complete search history.

(56) References Cited

U.S. PATENT DOCUMENTS 3,309,123 A    3/1967   Edwards
3,492,381 A    1/1970   Rhyne
(Continued)

FOREIGN PATENT DOCUMENTS

DE    1811425 U    5/1960
DE    1909050 A1   12/1970
(Continued)

*Primary Examiner* — Mary Lynn F Theisen
(74) *Attorney, Agent, or Firm* — Morgan, Lewis & Bockius LLP (57) ABSTRACT

The device has a support segment for supporting a workpiece, in particular a flat workpiece, and a carrier segment, in particular a cantilever, a gantry, or an articulated-arm robot, which carrier segment holds a working unit. According to a preferred embodiment, the carrier segment can extend at least partially over the support segment. The working unit, in turn, comprises a feeding unit for feeding a forming material and an attachment segment for a die. According to the invention, the die can be placed against a workpiece and comprises a cavity for forming a component.

15 Claims, 6 Drawing Sheets

(51) Int. Cl.
*B29K 711/14* (2006.01)
*B29C 31/00* (2006.01)
*B29C 70/74* (2006.01)

(56) References Cited

U.S. PATENT DOCUMENTS

| | | | |
|---|---|---|---|
| 3,611,480 A | 10/1971 | Zippel | |
| 4,247,510 A * | 1/1981 | Desverchere | B29C 45/14336 264/236 |
| 4,588,365 A | 5/1986 | Holzschuh | |
| 4,836,767 A | 6/1989 | Schad et al. | |
| 4,904,432 A * | 2/1990 | Harmer | A47C 5/12 264/112 |
| 5,091,131 A * | 2/1992 | Schumacher | B29C 45/14221 264/112 |
| 5,686,032 A * | 11/1997 | Mizobe | B29C 45/14336 264/267 |
| 5,842,809 A * | 12/1998 | Hwang | B29C 45/14344 403/263 |
| 8,990,985 B1 * | 3/2015 | Wilhelm | A47C 7/20 5/653 |
| 2003/0170422 A1 * | 9/2003 | Heta | B29C 66/12841 428/137 |
| 2005/0276874 A1 | 12/2005 | Menaldo et al. | |
| 2006/0073226 A1 * | 4/2006 | Kimura | B29C 45/14336 425/129.1 |
| 2007/0006553 A1 | 1/2007 | Hansen | |
| 2011/0215496 A1 * | 9/2011 | Ogura | B29C 45/76 264/40.4 |
| 2011/0248426 A1 * | 10/2011 | Fukushima | B29C 45/0013 264/328.1 |
| 2012/0286447 A1 | 11/2012 | Horeth et al. | |
| 2013/0099421 A1 * | 4/2013 | Kariya | B29C 45/0005 264/328.18 |
| 2014/0183771 A1 * | 7/2014 | Ikarashi | F01B 25/00 264/40.3 |
| 2014/0305366 A1 * | 10/2014 | Kuo | B29C 45/1418 116/63 C |
| 2015/0231823 A1 * | 8/2015 | Woerner | B29C 70/545 264/154 |
| 2015/0295210 A1 * | 10/2015 | Horimoto | F16J 15/122 277/654 |
| 2016/0207236 A1 * | 7/2016 | Tsubota | B32B 3/266 |

FOREIGN PATENT DOCUMENTS

| | | |
|---|---|---|
| DE | 3337546 A1 | 4/1985 |
| DE | 19930826 A1 | 1/2001 |
| DE | 19935441 A1 | 3/2001 |
| DE | 102009055983 A1 | 6/2011 |
| DE | 202006021039 U1 | 1/2012 |
| EP | 1325799 A1 | 7/2003 |
| EP | 1335137 A2 | 8/2003 |
| EP | 2383196 A1 | 11/2011 |
| EP | 2589478 A1 | 5/2013 |
| EP | 2889115 A1 | 7/2015 |
| WO | 2009102219 A1 | 8/2009 |
| WO | 2011103625 A1 | 9/2011 |

* cited by examiner

DEVICE FOR FORMING ADD-ON PARTS

TECHNICAL FIELD

The present invention relates to a device which is used in particular for machining and/or processing, for example, flat workpieces made of wood, wood materials or the like. Such workpieces are preferably used in the field of the furniture and components industry. Purely by way of example, these may be furniture fronts, insert-boards, frame elements or similar, as well as more complex components.

PRIOR ART

When producing workpieces in the domain of the furniture and components industry it is customary to subsequently provide initial workpieces made of wood or wood materials with add-on parts. These are, for example, supporting feet for cupboards, handles for drawers, pins for connecting such a workpiece to another workpiece, etc. For this purpose, the generally flat workpieces are provided with a bore hole into which the corresponding component is subsequently to be pushed.

In this connection it is known for the manufacturer to connect add-on parts to the workpiece. For this purpose, a plurality of such add-on parts are kept in a store which is to be stocked appropriately. The add-on parts are separated from this store and are fed to a machine which inserts these add-on parts into workpieces which have already been prepared. A woodworking machine, for example, can be used as this type of machine, which woodworking machine also carries out additional machining tasks on the workpieces, for example it provides the bore holes which are used for the insertion of the add-on parts.

However, it emerged that a large amount of logistic effort is required for the stocking of add-on parts, and moreover, corresponding storage capacities have to be provided.

SUMMARY OF THE INVENTION

The object of the present invention is to provide a device by means of which in particular flat workpieces can be provided with add-on parts with less logistic effort.

The subject matter of the independent claims provide a corresponding device and method. Additional preferred embodiments are given in the dependent claims.

In particular, a device is provided with which preferably flat workpieces made of wood, wood materials or the like can be machined and/or processed. The device has a support segment for supporting a workpiece, in particular a flat workpiece, and a carrier segment, in particular a cantilever, a gantry or an articulated-arm robot, which carrier segment holds a working unit. According to a preferred embodiment the carrier segment can extend at least partially over the support segment. The working unit, in turn, comprises a feeding unit for feeding a forming material and an attachment segment for a die. According to the invention the die can be placed against a workpiece and comprises a cavity for forming a component.

The working device according to the invention offers the advantage that, by means of the die, which can be placed against the workpiece, a component can be formed at the appropriate point by a forming material. Accordingly, it is no longer necessary to produce the corresponding component in advance and to attach or fasten it manually or mechanically to the workpiece. Moreover, it is guaranteed that the forming material that is delivered provides a close bond and strong adhesion to the workpiece. Narrow tolerances in the preceding machining of the workpiece or in the manufacture of components such as those that generally occur in the prior art can therefore be avoided or eliminated. Moreover, two processes which are normally separate from one another can be brought closer together.

Within the framework of the present invention it is preferable to use a forming material which partially comprises, for example, wood material, in particular wood foam, wood flour, abrasive dust, wood shavings, cellulose or similar. Furthermore, metal pastes or foams, synthetic pastes or foams, pasty material or electrically conductive materials such as copper paste or an electrically conductive plastic or electrically conductive biomaterials and bioplastics can be used.

Another alternative is a material that contains carbon fibres or glass fibres. Furthermore, thermoplastics, duroplastics or elastomeric plastics can be used.

In a preferred embodiment of the present invention the working unit has an extruder motor in order to convey a forming material fed via an introducing segment by moving an extruder screw disposed in the feeding unit. The introducing segment can be connected here to a store disposed adjacent to the machining device, or the store or the temporary store is attached directly to the introducing segment.

The forming material can be conveyed continuously to the die here. Alternatively, it is possible to introduce the forming material into the die in a delivery stroke. The forming material is thus conveyed into the die with a certain degree of pressure.

According to a preferred variant the extruder is in the form of a granulate extruder. According to another embodiment the extruder is in the form of a filament extruder.

According to another embodiment the device comprises a storage unit for holding a number of dies, which storage unit is preferably provided adjacent to the support segment. It is thus possible for dies with differently configured cavities to be kept ready on the machining device, and to be provided for machining by substituting them into the working unit. Thus, the machining device can respond flexibly to new working instructions.

According to a further modification the working unit can be moved in the vertical direction. In this way the die provided on the working unit can be pressed onto a workpiece. The die can be attached resiliently with respect to the working unit here.

In another embodiment the working unit comprises a sensor device, in particular a force and/or pressure sensor, in order to detect an arrangement of the die provided on the working unit with respect to a workpiece. In this way it is possible to position the die relative to the workpiece with force and/or pressure control so as to thus provide a seal between the die and the workpiece. A forming material introduced into the die is thus prevented from passing out of the die.

The configuration of the working unit provided with a sensor device may also have a spring with which the die is attached moveably with respect to the working unit.

According to a preferred embodiment the support segment is a conveying device by means of which workpieces can be moved and can be conveyed within the region of the working unit. In particular, a roller conveyor, a belt conveyor, a band conveyor or a chain conveyer is provided as the conveyor device. Alternatively or in addition to the conveyor device, the carrier segment may also be able to be moved along the support segment. One variant in which only the carrier segment can be moved is provided by a machining device which comprises suction clamps, clamping devices or similar in order to fix a workpiece.

According to another embodiment of the present invention the die comprises two moveable die halves. It is particularly preferred here if the die halves can move relative to one another. In particular, according to one preferred embodiment, the dies can pivot relative to one another or can move relative to one another. According to another variant, the aforementioned movements may occur in combination.

Within the framework of another preferred embodiment the die is substantially made in one part and has, from the discharge opening pointing towards the workpiece, at least one draft angle. In this way an add-on part can be formed on a workpiece, and the die can be removed from the workpiece by a movement. Purely by way of example, with this type of die conical add-on part, or those in the shape of a truncated cone, such as handles, supporting feet or similar can be attached.

The feeding unit according to the present invention may furthermore comprise a heated segment, in particular a heated hose. It is thus possible to keep the preferably pasty or partially liquid material conveyed through the feeding unit such that it can be conveyed. This embodiment is particularly suitable in combination with an extruder by means of which a starting material in granulate form can be brought into a pasty or pourable state and is conveyed into the feeding unit.

According to another embodiment the die comprises in the region of a discharge opening to the workpiece an annular projection which can be introduced into a bore hole in the workpiece. In this way it is possible to provide particularly effective sealing with respect to the workpiece and optionally to achieve centring.

Furthermore, an elastic ring can be provided which is introduced into a depression, in particular a bore hole, in a workpiece or is placed around a depression, in particular a bore hole, in a workpiece, or the discharge opening is provided with a bevel.

Alternatively or in addition, in particular with a die which has two or more die halves, a bevel may be provided in the region of the discharge opening.

According to a preferred embodiment the working unit can be pivoted about at least one axis, preferably about two or more axes, and/or the die can be pivoted about at least one axis, preferably about two or more axes. In this way it is possible to place the die against an inclined surface of the workpiece, and so to form a component on this inclined surface.

Furthermore, it is preferred if the die has a cooling device. In this way the curing process for the forming material can be accelerated.

In addition to the device that has been described, the present invention also relates to the use of the latter to form add-on parts on, in particular, flat workpieces and to a method. Within the framework of the use and/or of the method, the described device or elements thereof, as well as certain embodiments of the die, can be used.

In this connection the invention provides a method comprising the steps: providing a workpiece, placing a die against the workpiece, which die comprises a cavity for forming a component and a discharge opening, introducing, in particular pushing, a forming material into the die in order to form a component on the workpiece.

Preferably, the introduction of the forming material into the die can be carried out with pressure control.

Preferably, the workpiece is provided with a depression, in particular a bore hole (or one such depression is made in the workpiece), and the discharge opening of the die is disposed in the region of the depression on the workpiece. In this way the forming material passes from the discharge opening of the die into the depression of the workpiece so that an advantageous connection between the formed component and the workpiece is provided.

After the forming material is introduced with a certain degree of pressure into the die and penetrates into the depression of the workpiece, the forming material can be pushed into pores in the workpiece. The forming material thus interlocks with the workpiece after it has cured.

DETAILED DESCRIPTION OF THE PREFERRED EMBODIMENTS

In the following exemplary embodiments of the present invention are explained with reference to the attached figures. Further modifications of specific individual features that are mentioned in this connection may respectively be combined with one another individually in order to form further embodiments.

Figure 1:
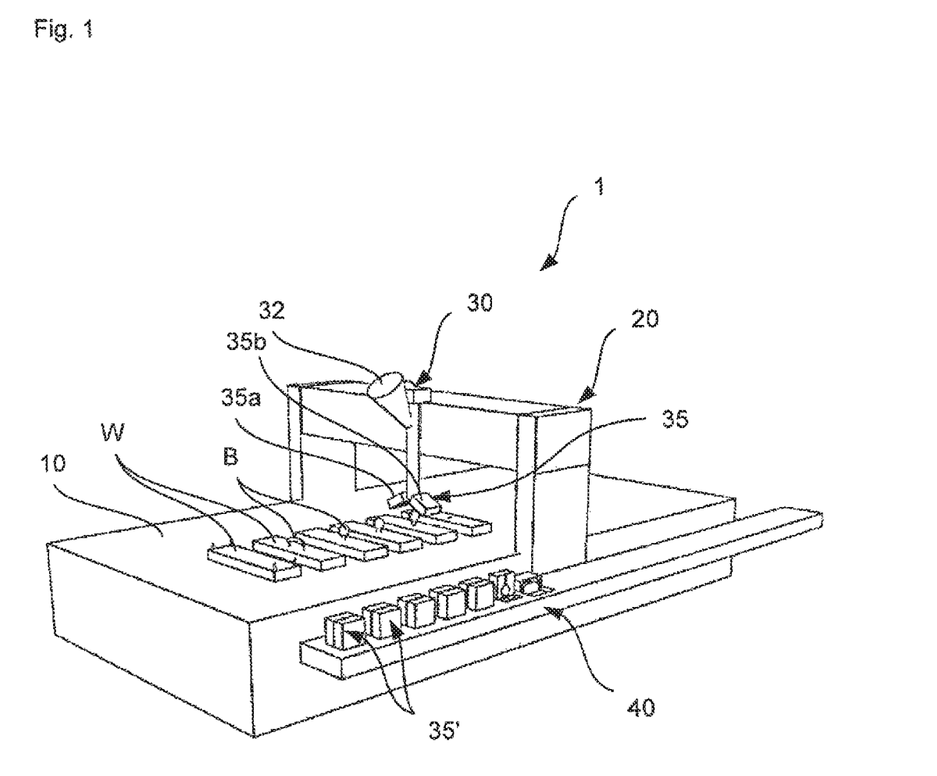
FIG. 1 is a perspective view of a preferred embodiment of the present invention

The machining device 1 shown in FIG. 1 comprises a support segment 10 for holding workpieces W. The support segment 10 is only illustrated schematically in the figures and comprises, for example, a machine bed and a support table. Furthermore, the support segment may comprise a conveying device for conveying workpieces into the region of a carrier segment 20. Purely by way of example, it is possible in this connection to hold the workpieces W on suction clamps which can be moved relative to the machine bed.

Within the framework of the present embodiment the carrier segment 20 is a gantry against which a working unit 30 is held. The working unit 30 can be moved along the carrier segment 20 by means of a carriage and so can adopt different positions in the transverse direction above the support segment 10. Additionally, the carrier segment can be moved along the support segment 10.

The working unit 30 comprises a feeding unit 31 which, according to the present embodiment, holds an extruder screw. Furthermore, there is provided on an upper segment of the working unit 30 in the vertical direction an introducing segment 32 which is only illustrated schematically in the figures. Disposed on the working unit 30 in the region of the introducing segment 32 is an extruder motor 33 which is therefore likewise provided on an upper segment of the working unit 30 in the vertical direction. The extruder motor 33 drives the extruder screw held in the feeding unit in order to convey forming material to a die (described below) attached to the working unit 30. The introduction of the forming material, which either takes place continuously or with a delivery stroke, takes place with a certain degree of pressure so that the forming material fills a cavity in the die and furthermore penetrates into a bore hole in the workpiece. By applying pressure, the material is furthermore pushed into pores of the surface of the bore hole. This is particularly advantageous in the case of chipboards.

The working unit 30 further comprises an attachment segment for holding a die 35. The die 35 can, as explained below, be replaced with another die 35'. Accordingly, the working unit 30 is provided with a corresponding interface by means of which the described exchange of dies is made possible.

Adjacent to the support segment 10 is a storage unit 40 which, according to the present embodiment, extends on a long side of the support segment 10 of the machining device 1. The storage unit 40 is set up to hold a number of dies 35' which may be substituted into the working unit 30. The transfer of the dies 35' to the machining unit 30 is not explicitly shown in the figures due to the schematic illustration, but is easily comprehensible to people skilled in the art. In particular, the exchange system for the dies may be compared to a tool changer.

According to another modification, the storage unit 40 may also be in the form of a disc changer which comprises a pivotable disc with a number of positions for holding dies. In addition, this type of storage device may also comprise a number of holding planes.

Although not shown in the figures, a transfer device can furthermore be provided for removing a die from the storage unit 40 and transferring it to the working unit 30.

Figure 2:
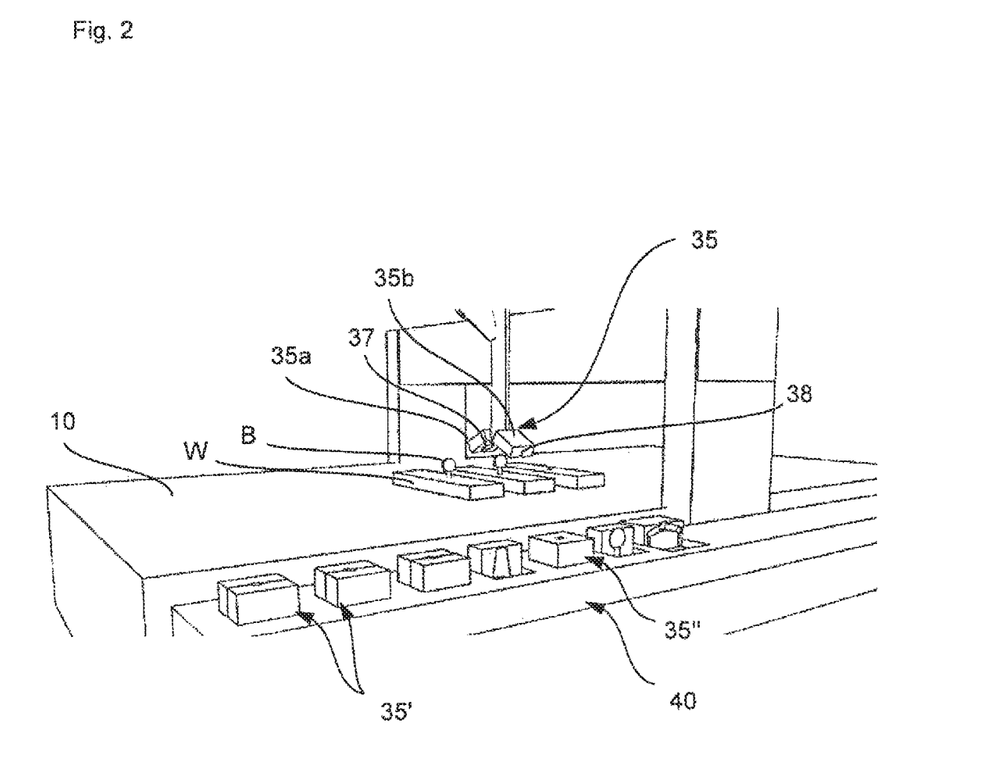
FIG. 2 shows an enlarged view of the embodiment illustrated in FIG. 1
Figure 3:
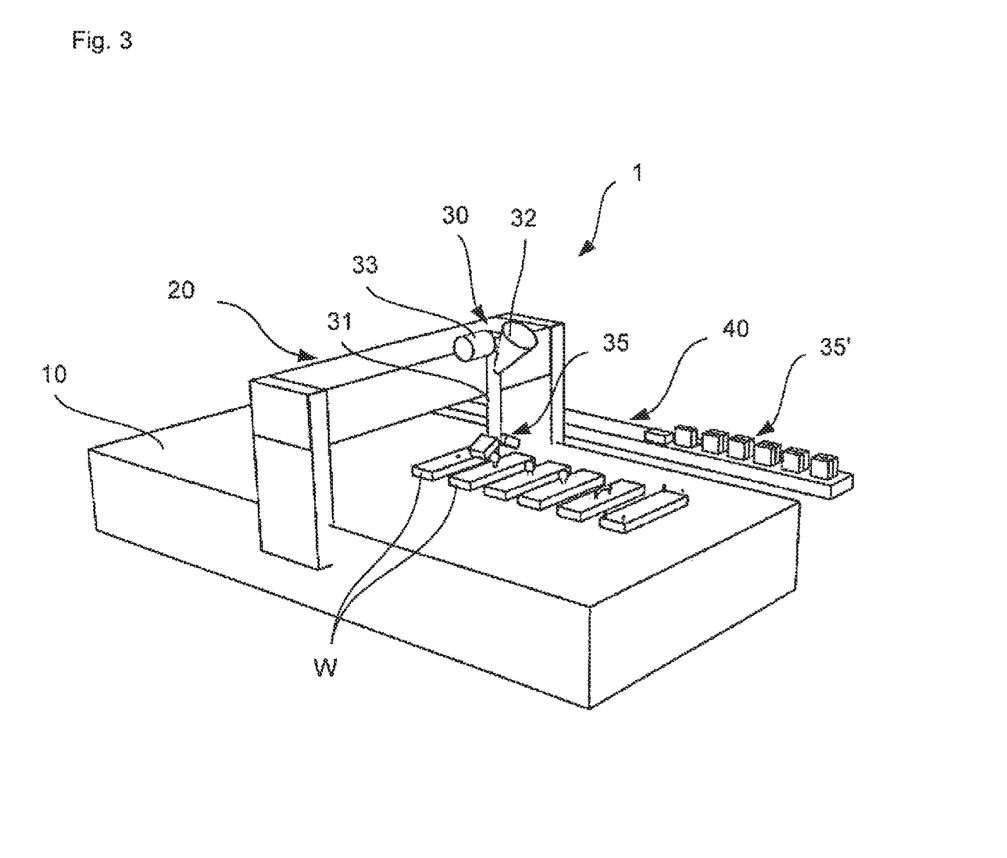
FIG. 3 is another perspective view of the embodiment illustrated in FIG. 1
Figure 4:
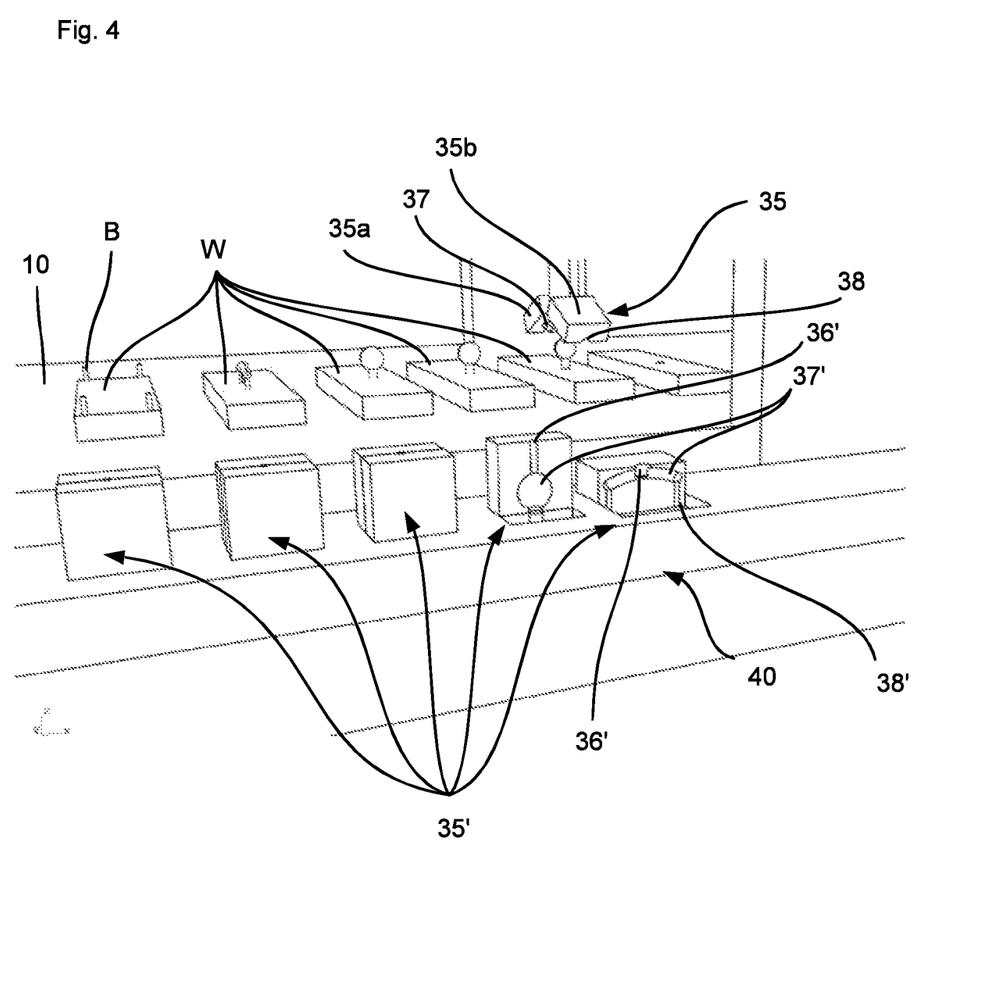
FIG. 4 shows a segment of the embodiment shown in FIG. 1 in detail

The die 35, which is for example attached to the working unit 30 in FIG. 1, is composed according to one embodiment of two die halves 35*a*, 35*b* which can be pivoted relative to one another. In this way it is possible to provide the component B illustrated in FIG. 1 and FIG. 2 on the workpiece W which shows a door knob for a draw with a spherical segment.

The form of the components B which can be attached to a workpiece W is defined by the configuration of the cavity 37, 37' of the die 35, 35'. A wide variety of examples of such components B are illustrated in the figures. For example, component B can be a cylindrical pin, a drawer handle, a spherical knob or similar.

The die 35, 35' comprises an inlet opening 36, 36' through which a forming material can be introduced into the die, which forming material passes through the feeding unit 31. From the inlet opening 36, 36' the forming material passes into the cavity 37, 37' of the die. The die further comprises a discharge opening 38, 38' which is connected to the cavity 37, 37' and is formed on the side of the die which points towards a workpiece W during operation of the die.

Figure 6:
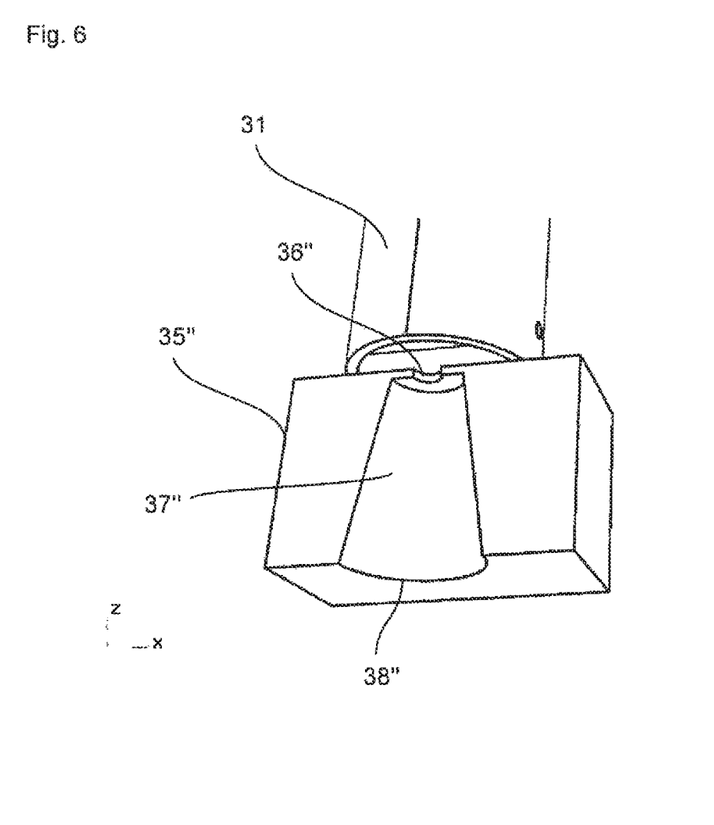
FIG. 6 shows a partial sectional view of a die with a cavity with a draft angle

Although the die according to one embodiment in FIGS. 1-4 is made in two parts, within the framework of the present invention a one-part die 35 can also be used, as shown for example in FIG. 6.

The die 35" illustrated in FIG. 6 comprises here, as in the previous examples, an inlet opening 36", a cavity 37" and a discharge opening 38". In the embodiment shown in FIG. 6 the cavity 37" is in the form of a truncated cone, and so the side wall of the cavity 37" represents a draft angle. In this way it is possible to introduce a forming material through the inlet opening 36 into the cavity 37", the forming material entering the workpiece W partially through the discharge opening 38" into a depression, notch or bore hole. After the forming material has cured at least partially, the die 35" according to FIG. 6 can be removed from the workpiece W, the component B formed on the workpiece W remaining on the latter.

Therefore, operation of the machining device 1 can be described in detail as follows.

First of all a workpiece W is delivered which is preferably provided with one or more bore holes or is provided with one such bore hole by means of the machining device 1 which is provided with a drilling or milling unit.

Although within the framework of the present embodiment a bore hole or a similar depression is preferably prepared on the workpiece W in the region in which the component B is to be provided, the workpiece W must not necessarily be provided with such a bore hole. Furthermore, other types of depression may alternatively be provided on the workpiece.

The working unit 30 is aligned by a movement of the workpiece W and/or movements of the carrier segment 20 or of the working unit 30 relative to one another. Then the working unit 30 is advanced in a vertical direction towards the flat workpiece W so that the discharge opening 38 of the die 35 is aligned with the bore hole already provided in the workpiece W. Then the die 35 is pressed against the workpiece by a movement of the working unit 30 or a movement of the die 35 relative to the working unit 30.

Preferably, a sensor device is provided in the region of the die 35 or of the working unit 30 in order to establish a sufficient contact pressure. If there is an appropriate contact pressure which guarantees sealing of the die relative to the workpiece W, the extruder motor 33 is actuated in order to convey forming material in the direction of the die 35.

After the forming material has at least partially cured, the two-part die 35 according to FIG. 1 is opened by a pivoting motion and the component B formed by the die 35 cures further at ambient temperature.

In this connection the die can be provided with a cooling element or a cooling device in order to cool the forming material actively after being introduced into the die, and so to accelerate the processing procedure further.

Figure 5A:
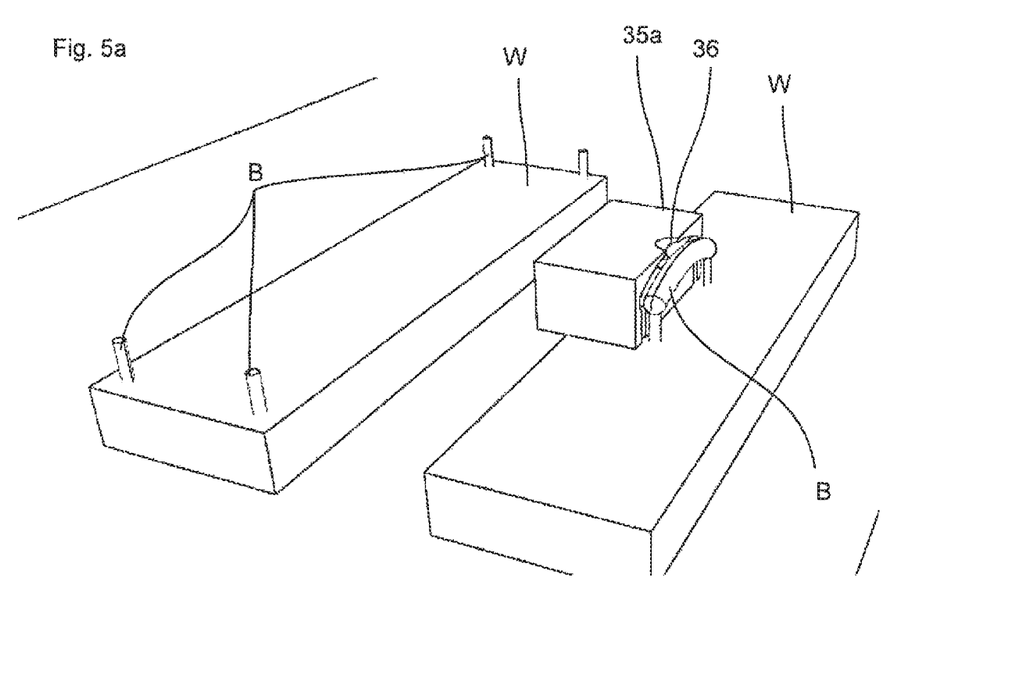
FIG. 5*a* is another detailed view of elements which are produced in the machining device according to the present embodiment
Figure 5B:
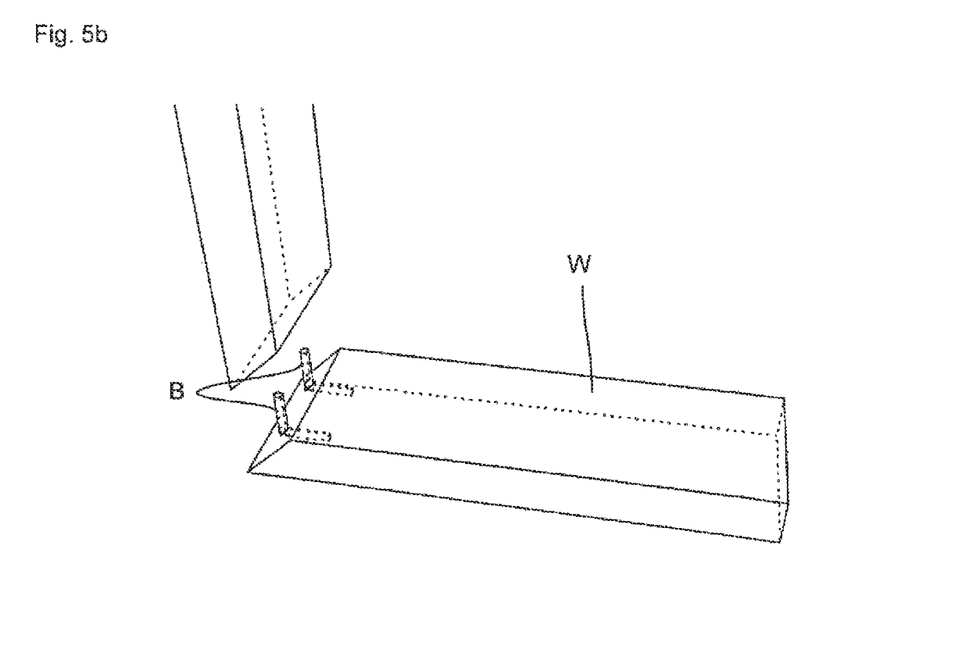
FIG. 5*b* shows an example of a workpiece which has been provided with two add-on parts (dowels) on an inclined surface

Different examples of add-on parts on workpieces are shown in FIGS. 5*a* and 5*b*.

For example, a workpiece W with a number of pins (see the illustration on the left in FIG. 5*a*) or a handle (see the illustration on the right in FIG. 5*a*) can be provided as an example of an add-on part B.

Furthermore, within the framework of the present invention it is possible to attach add-on parts B to an inclined surface of a workpiece W (see FIG. 5*b*). For this purpose, the working unit 30 and/or the die 35, 35' is/are turned so that the latter can be placed against the inclined surface of the workpiece W.

Although within the framework of the above description dies have been described which have a single cavity, according to another configuration of the present invention it is possible to use dies which comprise a number of cavities so that a number of components can be formed on a workpiece at the same time.

The invention claimed is:

1. A device for processing workpieces made of wood or wood materials, comprising:
   a support segment for holding a workpiece; and
   a carrier segment, comprising at least one of a cantilever, a gantry or an articulated-arm robot, which carrier segment holds a working unit,
   the working unit holding a die which can be placed against a workpiece and comprising a feeding unit for feeding a forming material into an inlet opening of the die, which die has a cavity for forming a component and a discharge opening, wherein the working unit can be pivoted about at least one axis, and/or the die can be pivoted about at least one axis.

2. The device according to claim 1, wherein the working unit has an extruder motor with which an extruder screw disposed in the feeding unit can be driven.

3. The device according to claim 1, wherein the device comprises a storage unit for holding a number of dies, which storage unit is provided adjacent to the support segment.

4. The device according to claim 1, wherein the working unit can be moved in the vertical direction.

5. The device according to claim 1, wherein the working unit comprises a sensor device comprising at least one of a force or pressure sensor, in order to detect an arrangement of the die provided on the working unit with respect to a workpiece, and/or the die can be moved resiliently.

6. The device according to claim 1, wherein the support segment is a conveying device comprising at least one of a roller conveyor, a belt conveyor, a chain conveyor or a band conveyer, in order to move a workpiece, and/or the carrier segment is moveable and can travel along the support segment.

7. The device according to claim 1, wherein the die has two die halves that can be moved, pivoted and/or shifted relative to one another.

8. The device according to claim 1, wherein the die is made in one part, the cavity of the die having a draft angle.

9. The device according to claim 1, wherein the feeding unit has a heated segment for feeding a forming material.

10. The device according to claim 1, wherein the die has in the region of the discharge opening an annular projection or an elastic ring which can be introduced into a depression, comprising a bore hole, in a workpiece or can be placed around a depression, comprising a bore hole, in a workpiece, or the discharge opening is provided with a bevel.

11. The device according to claim 1, wherein the working unit can be pivoted about two or more axes, and/or the die can be pivoted about two or more axes.

12. The device according to claim 1, wherein the die has a cooling device.

13. A method for processing workpieces made of wood or wood materials using a device according to claim 1, comprising the steps:

providing a workpiece, placing a die against the workpiece, which die comprises a cavity for forming a component and a discharge opening, wherein the die can be pivoted about at least one axis, and introducing a forming material into the die by pushing the forming material into the die in order to form a component on the workpiece.

14. The method according to claim 13, wherein the workpiece is provided with a depression, comprising a bore hole, and the discharge opening of the die is disposed in the region of the depression on the workpiece.

15. The method according to claim 13, wherein the forming material is selected from a material that comprises at least partially wood material, including at least one of wood foam, wood flour, abrasive dust, wood shavings, cellulose, a metal paste or foam, a synthetic paste or foam, or a pasty material.

* * * * *